(12) United States Patent
Kim et al.

(10) Patent No.: US 8,384,723 B2
(45) Date of Patent: Feb. 26, 2013

(54) METHOD AND SYSTEM OF RENDERING PARALLEL GLOBAL ILLUMINATION

(75) Inventors: Sung-Soo Kim, Daejeon (KR); Joo-Haeng Lee, Daejeon (KR); Jae Sook Cheong, Daejeon (KR); Jin Sung Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 436 days.

(21) Appl. No.: 12/808,517

(22) PCT Filed: Oct. 8, 2008

(86) PCT No.: PCT/KR2008/005887
§ 371 (c)(1),
(2), (4) Date: Jun. 16, 2010

(87) PCT Pub. No.: WO2009/078561
PCT Pub. Date: Jun. 25, 2009

(65) Prior Publication Data
US 2011/0122135 A1    May 26, 2011

(30) Foreign Application Priority Data
Dec. 17, 2007    (KR) .................. 10-2007-0132544

(51) Int. Cl.
*G06F 15/80*    (2006.01)
*G06K 9/54*    (2006.01)
(52) U.S. Cl. ........................ 345/505; 382/304
(58) Field of Classification Search .................. None
See application file for complete search history.

(56) References Cited

U.S. PATENT DOCUMENTS

| | | | |
|---|---|---|---|
| 6,184,903 | B1 | 2/2001 | Omori |
| 6,496,187 | B1 | 12/2002 | Deering et al. |
| 7,075,541 | B2 | 7/2006 | Diard |
| 2002/0163501 | A1 | 11/2002 | Brouard et al. |
| 2005/0140689 | A1 | 6/2005 | Pallister |
| 2006/0279577 | A1 | 12/2006 | Bakalash et al. |

FOREIGN PATENT DOCUMENTS
KR    10-2002-0063057    8/2002

OTHER PUBLICATIONS

I. T. Dimov et al., Parallel Monte Carlo Approach for Integration of the Rendering Equation, NMA 2006, LNCS 4310, pp. 140-147, Springer-Verlag, 2007.*
Andreas Raabe, et al., "Hardware Accelerated Collision Detection— An Architecture and Simulation Results," Proceedings of the Design, Automation and Test in Europe Conference and Exhibition, 2005.

(Continued)

*Primary Examiner* — Kee M Tung
*Assistant Examiner* — Haixia Du
(74) *Attorney, Agent, or Firm* — Staas & Halsey LLP

(57) ABSTRACT

A method of rendering parallel global illumination for obtaining a photo-realistic rendering image, includes: generating candidate parallel random numbers for creating a sample; creating a sample by selecting one of the generated random numbers; performing Monte Carlo integration on the basis of the created sample; and providing an application programming interface (API) common to operations having attributes of algorithm parallelism and data-level parallelism according to processed works, so that a common call interface calls a sample creating function, a random number generating function, and a Monte Carlo integration performing function. Furthermore, the method includes: demanding an operation regarding a processed work from a system call controller by the common call interface; performing parallel processing through a preset scheduling when the system call controller performs the operation demanded by the common call interface; and performing the processed work transferred from the system call controller by an operation hardware.

10 Claims, 7 Drawing Sheets

OTHER PUBLICATIONS

Sven Woop, et al., "RPU: A Programmable Ray Processing Unit for Realtime Ray Tracing," Association for Computing Machinery, Inc., 2005.

International Search Report mailed May 20, 2009 in corresponding International Application No. PCT/KR2008/005887.

* cited by examiner

METHOD AND SYSTEM OF RENDERING PARALLEL GLOBAL ILLUMINATION

CROSS-REFERENCE TO RELATED APPLICATIONS

The present invention claims the benefit of International Application No. PCT/KR2008/005887, filed Oct. 8, 2008, and claims priority of Korean Patent Application No. 10-2007-0132544, filed on Dec. 17, 2007, the disclosures of all of which are incorporated herein by reference.

TECHNICAL FIELD

The present invention relates to a technology for handling global illumination-based rendering, and more particularly to a method and a system of rendering parallel global illumination that are suitable for improvement of processing speed by performing essential operations (generation of random numbers, Monte Carlo integration, etc.) causing bottlenecks through a common interface when global illumination-based rendering is performed through a single central processing unit (hereinafter, referred to as 'CPU').

BACKGROUND ART

In general, global illumination algorithms are mainly used to add realistic light effects to a three-dimensional screen in three-dimensional graphics. In order to obtain a physically accurate rendering result, it is necessary to realistically calculate an operation of light. However, complex calculations are required to accurately simulate the operations of an object in a scene and light, consuming a considerable amount of time. The most well-known methods for simulating light include ray tracing, radiosity, particle tracing, etc. Among them, the ray tracing is being most widely used.

The ray tracing draws the appearance of an object by tracing the travel route of light along the direction opposite to that in which the light enters a camera to calculate refraction and reflection of the light and then determine a pixel value. Probability-based Monte Carlo integration has been mainly used in order to obtain a photo-realistic rendering result in a physically-based global illumination renderer. However, a large number of samples and calculations are necessary to obtain a high-quality rendering image, improving the processing speed. Furthermore, since there exists a limit in optimization of a single CPU-based algorithm regarding Monte Carlo integration and Quasi-Monte Carlo integration, it is difficult to expect a high efficiency.

Since calculation of one pixel is completely independent from calculation of another one in the ray tracing, a ray tracing algorithm itself is most suitable for a parallel processing environment. Therefore, a parallel ray tracing method using a multiprocessor has been widely used. In the ray tracing, the processing speed can be improved basically by reducing a primitive intersection time between object primitives in the scene and rays and a Monte Carlo integration time. This is because the node traversal in the hierarchy, primitive intersection operation, and Monte Carlo integration is more expensive operations compared to the construction of object hierarchy, such as, kd-tree and BVH.

However, Monte Carlo integration is still the one of major bottlenecks in realistic image synthesis. Moreover, convincing methods for real-time processing have not been introduced yet.

As mentioned above, in conventional real time rendering systems, studies on development of hardware capable of accelerating ray tracing have been disclosed, but since they do not support a tracing function from a secondary ray, they cannot be applied to a photo-realistic rendering image synthesis fields. Furthermore, since the dedicated hardware for Monte Carlo integration has not been implemented, the performance for the global illumination image synthesis still cannot be remarkably improved.

DISCLOSURE OF INVENTION

Technical Problem

In view of the above, the present invention provides a method and a system of parallel global illumination renderer that can shorten a rendering time by promptly performing mutual interaction between objects in a scene and light in a physically-based global illumination renderer.

Further, the present invention provides a method and a system of rendering parallel global illumination that can improve the processing speed by performing essential operations (generation of random numbers, Monte Carlo integration, etc.) causing bottlenecks through a common interface when global illumination-based rendering is performed through a single central processing unit.

Furthermore, the present invention provides a method and a system of parallel global illumination renderer that can perform parallel processing by dividing a global illumination rendering inputting scene according to sections and distributing and scheduling a work according to execution time points under the control of a common interface, thereby improving the processing speed.

Technical Solution

In accordance with a first aspect of the present invention, there is provided a method of parallel global illumination renderer for obtaining a realistic rendering image. The method includes: generating candidate parallel random numbers for creating a sample; creating a sample by selecting one of the generated random numbers; performing Monte Carlo integration on the basis of the created sample; providing an application programming interface (API) common to operations having attributes of algorithm parallelism and data-level parallelism according to processed works, so that a common call interface calls a sample creating function, a random number generating function, and a Monte Carlo integration performing function; demanding an operation regarding a processed work from a system call controller by the common call interface; performing parallel processing through a preset scheduling according to the attribute of the processed work when the system call controller performs the operation demanded by the common call interface; and performing the processed work transferred from the system call controller by an operation hardware.

In accordance with a second aspect of the present invention, there is provided a system of parallel global illumination renderer. The system includes: a parallel random number generator generating candidate parallel random numbers in order to create a sample for rendering a realistic image; a sample creator creating a sample by selecting one of the generated random numbers; a Monte Carlo integration handler handling Monte Carlo integration on the basis of the created sample; a common call interface calling functions of the sample creator, the parallel random number generator, and the Monte Carlo integration handler, providing an application programming interface (API) common to operations having attributes of algorithm parallelism and data-level parallelism according to processed works, and demanding an operation regarding a processed work from a system call controller; a system call controller performing parallel processing through a preset scheduling according to the attribute of the processed work when the system call controller performs the operation demanded by the common call interface; and an operation hardware performing the work transferred from the system call controller.

Modern high-performance hardware architectures feature two distinct features: parallelism through many cores/execution units, and a SIMD-way of execution inside each core.

The number of cores typically is in the few dozens (e.g., 16 cores on a 4-way Harpertown workstation, and 16 cores on a NVIDIA GTX8800. Current SIMD width for CPUs is 4. (increasing to 8 in the near future) and recent GPUs provide and even higher SIMD width using their parallel floating point units. Exploiting SIMD means performing the same basic operation on multiple data elements. In ray tracing, the most common SIMD operations are node traversal, primitive intersection, and shading.

ADVANTAGEOUS EFFECTS

In accordance with the present invention, a bottleneck phenomenon can be remarkably reduced through algorithm parallelism and data-level parallelism that perform operations (such as creation of a sample, generation of random numbers, Monte Carlo integration, etc., that cause lowering of speed due to a bottleneck phenomenon of a single CPU) by using various hardware resources, such as, a multi-core CPU, a GPU, a dedicated SIMD hardware, etc. and the processing speed can be improved by enhancing parallelism by determining the corresponding parallelism attribute at run time and controlling calls of various hardware resources.

Therefore, the present invention can be promptly and simply performed in the fields of real-time global illumination and interactive ray tracing, and provides a programmable flexibility by enabling control of a user through a shader program. Furthermore, in primitive intersection, since the number of examined primitive objects is remarkably reduced through hierarchical acceleration structures when an operation is performed, the primitive intersection can be accelerated through the dedicated hardware.

BRIEF DESCRIPTION OF THE DRAWINGS

The objects and features of the present invention will become apparent from the following description of embodiments given in conjunction with the accompanying drawings, in which.

BEST MODE FOR CARRYING OUT THE INVENTION

Hereinafter, the operational principle of the present invention will be described in detail with reference to the accompanying drawings.

Figure 1:
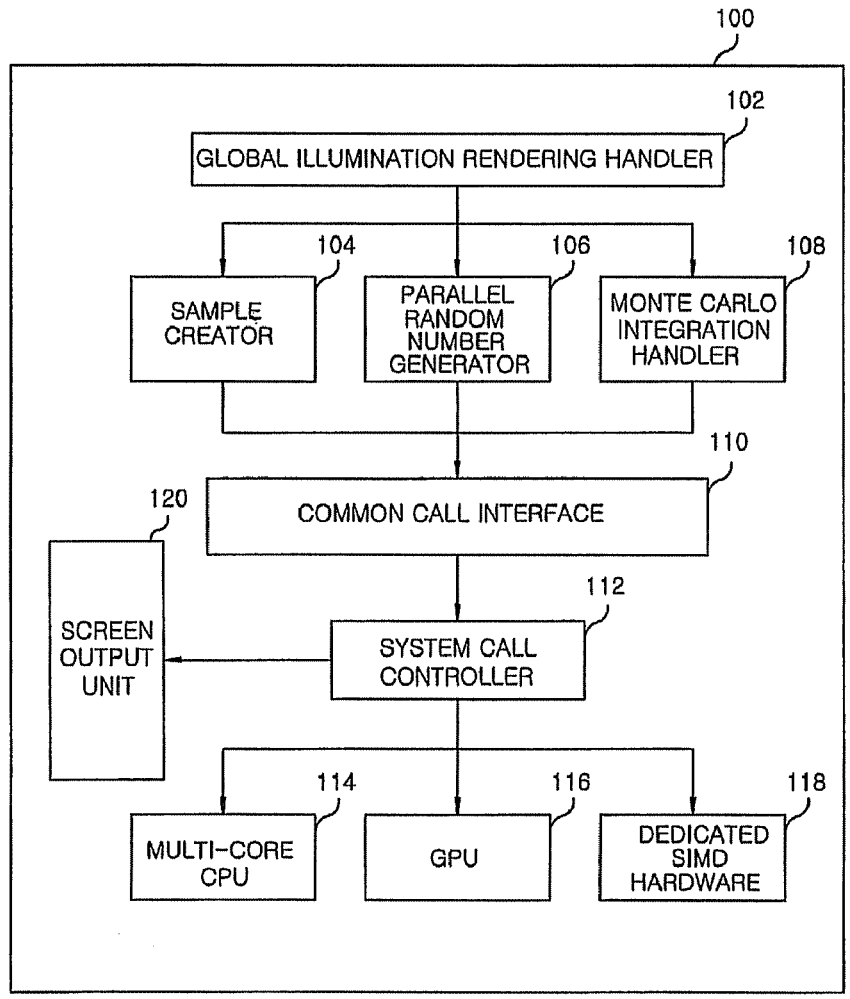
FIG. 1 is a view illustrating the structure of a parallel global illumination rendering system in accordance with an embodiment of the present invention.

FIG. 1 is a view illustrating the structure of a parallel global illumination rendering system in accordance with an embodiment of the present invention.

With reference to FIG. 1, a parallel global illumination rendering system 100 includes a global illumination rendering handler 102 for obtaining a realistic rendering image, a sample creator 104 efficiently performing a sampling function, a parallel random number generator 106 promptly generating random numbers in a parallel processor core, a Monte Carlo integration handler 108 performing a Monte Carlo integration function, a common call interface (application programming interface: API) for calling functions of the sample creator 104, the parallel random number generator 106, and the Monte Carlo integration handler 108, a system call controller 112 calling and controlling hardware according to a situation of execution time of functions related to the common call interface 110, multi-core CPUs 114, GPUs 116, and dedicated SIMD hardwares 118 that perform a function actually called by a user; and a screen output unit 120 outputting a final rendering result.

The parallel global illumination rendering system 100 receives geometry information of objects in order to handle high quality rendering based on a physical light transport, stores it in a main memory, and achieves a rapid rendering speed by parallel processing through various hardware resources, such as multi-core CPUs 114, programmable GPUs 116, and a dedicated SIMD hardwares 118. During rendering of global illumination, creation of random numbers for generating rays and Monte Carlo integration that cause a bottleneck phenomenon can be remarkably improved through an extended parallel random number generation method and a system call control method according to a situation of run time of functions related to the common call interface 110.

In a traditional rendering application system, a single CPU handles physically-based global illumination rendering, and a GPU displays a three-dimensional scene on a user screen. Here, the processing speed of random number generation, that is one of rendering operations performed by a single CPU, is severely slow as compared with dedicated SIMD hardware, and Monte Carlo integration is a major bottleneck point. In order to overcome the above-mentioned problem, the parallel global illumination rendering system 100 performs functional parallelism by employing a multi-core CPU 114 instead of a CPU having a single core.

However, the processing speed of data-level parallelism for processing a plurality of data with respect to one single instruction has not been satisfyingly enhanced. Accordingly, the applicant designed the parallel global illumination rendering system 100 in order to enhance the global illumination rendering speed by using the GPU 116 and the dedicated SIMD hardware 118 as well as the multi-core CPU 114 to maximize functional parallelism (algorithm parallelism) and data-level parallelism.

In the parallel global illumination rendering system 100, the global illumination rendering handler 102 handles global illumination rendering for obtaining a realistic image. That is, the parallel global illumination rendering system obtains color values of pixels of a rendering image through numerical Monte Carlo integration. Monte Carlo integration is a general and powerful technique for processing an arbitrary function. Integration of a function f(x), i.e.

$$I = \int f(x)dx$$

can calculate a Monte Carlo estimator using a probability distribution function (PDF) in Math FIG. 1.

Figure 2:
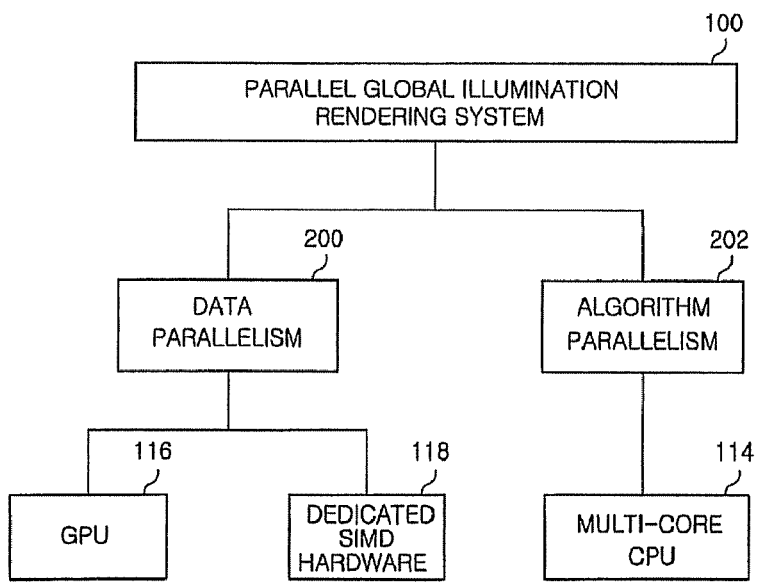
FIG. 2 is a view illustrating a method of calling hardware for rendering handling works in a parallel global illumination rendering system in accordance with an embodiment of the present invention.

MathFigure 1

$$<I> = \frac{1}{N} \sum_{i=1}^{N} \frac{f(xi)}{p(xi)} \quad [\text{Math. 1}]$$

where, the variance of the estimator is obtained in Math FIG. 2.

MathFigure 2

$$\sigma^2 = \frac{1}{N} \int \left(\frac{f(x)}{p(x)} - I\right)^2 p(x)dx \quad [\text{Math. 2}]$$

Three steps of Monte Carlo integration are as follows:
Creation of a Sample according to a probability distribution function (PDF)
Evaluation of functions in the created sample
Calculation of a mean of samples having suitable weights
Here, the sample creator 104 used various methods to select a sample from random numbers generated through the parallel random number generator 106. For example, in a rejection sampling technology, samples satisfying a condition of p(x)<y are rejected from generated random numbers (x, y). Therefore, the parallel random number generator 106 generates candidate random numbers for creation of a sample in the sample creator 104.

The sample creator 104 creates a sample necessary for global illumination rendering.

The parallel random number generator 106 generates random numbers facilitating data-level parallelism in parallel. If a random number generating algorithm operated in a single CPU is simply applied to the multi-core CPU 114, random numbers having a same period for cores are generated, damaging the randomness of random numbers. Therefore, it is necessary to separately implement a parallel random number generation algorithm. The Monte Carlo integration handler 108 handles probability-based Monte Carlo integration.

The common call interface 110 provides an API common to functions of the sample creator 104, the parallel random number generator 106, and the Monte Carlo handler 108 and general operations having functional parallelism and data-level parallelism. The common call interface 110 can be used in a high priority application independently from a low priority hardware and provides an advantage of using various hardware without correction of a high priority application program.

The system call controller 112 provides a function of calling suitable hardware by determining the attribute of the function required by the common call interface 110 in the execution time thereof. An algorithm for largely classifying the attribute of the corresponding function into data-level parallelism and functional algorithm parallelism in the run time is necessary to provide the function for calling suitable hardware. For example, since an operation of data-level parallelism is one specialized in the GPU 116 and the dedicated SIMD hardware 118 rather than the multi-core CPU 114, the system call controller 112 controls a call so that it can be performed in the GPU 116 and the dedicated SIMD hardware 118.

FIG. 2 is a view illustrating a method of calling hardware for rendering handling works in a parallel global illumination rendering system in accordance with an embodiment of the present invention.

With reference to FIG. 2, an operation 200 of data-level parallelism when rendering is handled through the parallel global illumination rendering system 100 is performed by the GPU 116 and the dedicated SIMD hardware 118 and an operation of an algorithm-level parallelism 202 is performed by the multi-core CPU 114.

Figure 3:
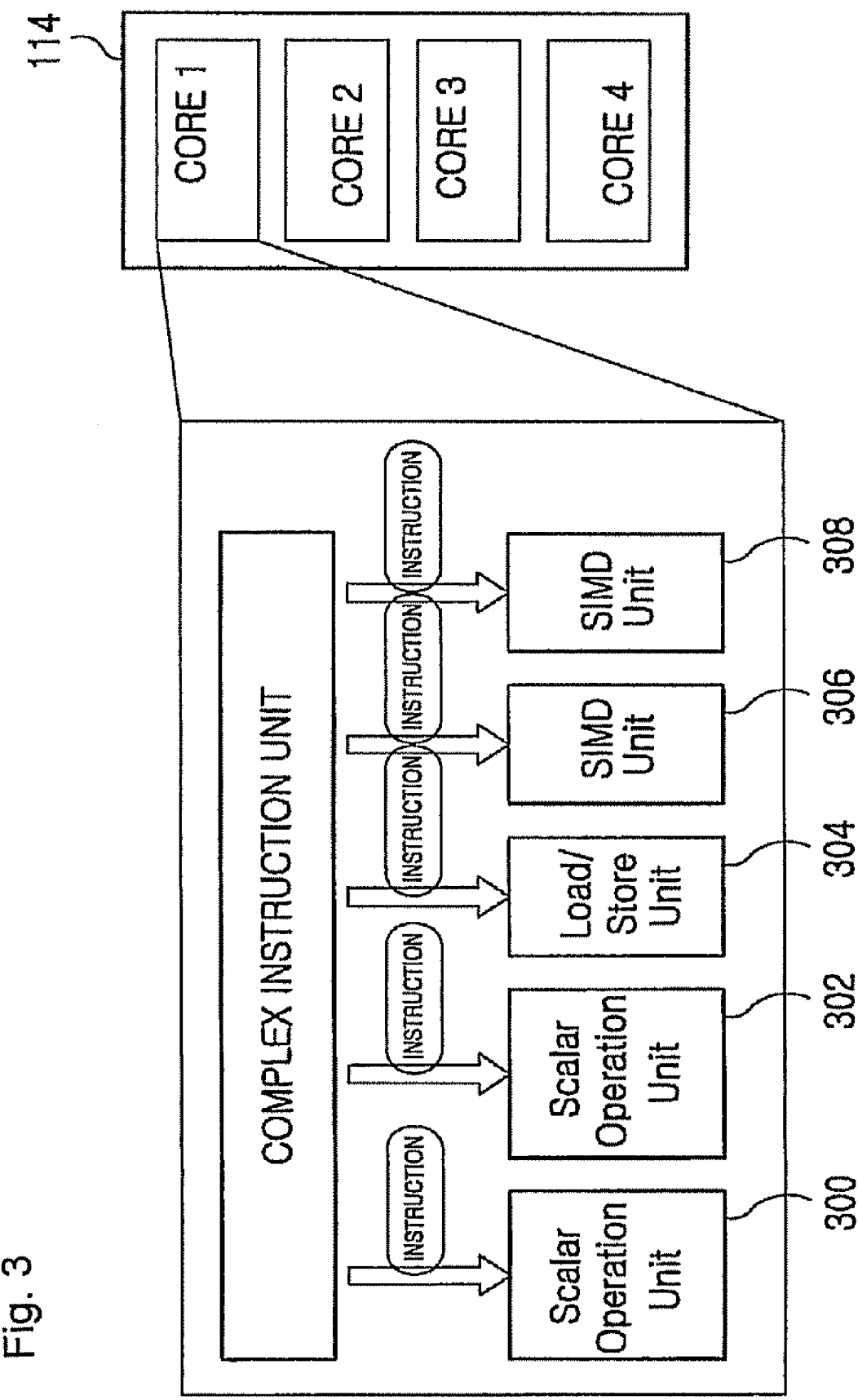
FIG. 3 is a block diagram illustrating the structure of a multi-core CPU of a parallel global illumination rendering system in accordance with an embodiment of the present invention.

FIG. 3 is a block diagram illustrating the structure of a multi-core CPU of a parallel global illumination rendering system in accordance with an embodiment of the present invention.

With reference to FIG. 3, in the multi-core CPU 114, a plurality of processor cores (FIG. 3 illustrates only four cores, but the number of cores is not limited to four) are mounted to one processor die. One core includes several scalar operation units 300 and 302 of a super-scalar structure, and a load/store unit 304 and several SIMD units 306 and 308. In the multi-core CPU 114, the cores issue different instructions to execution units. Therefore, since a plurality of instructions can be performed in parallel through several cores in the global illumination rendering system 100, a work having algorithm parallelism can be effectively processed by calling the multi-core CPU 114.

Figure 4:
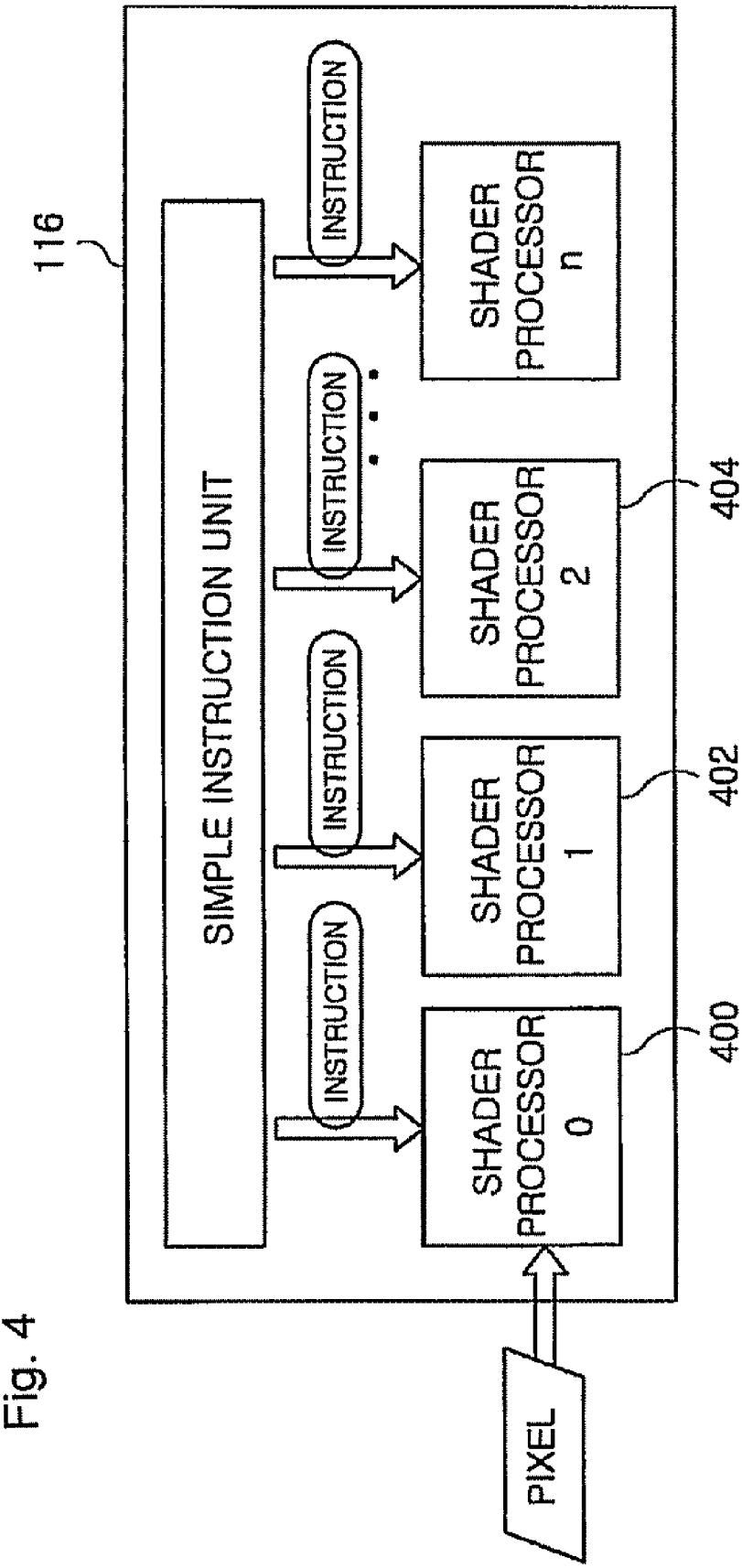
FIG. 4 is a block diagram illustrating the structure of a GPU of a parallel global illumination rendering system in accordance with an embodiment of the present invention.

FIG. 4 is a block diagram illustrating the structure of a GPU of a parallel global illumination rendering system in accordance with an embodiment of the present invention.

As illustrated in FIG. 4, the GPU 116 includes a plurality of programmable shader processors 400, 402, and 404 for operations. The processors are managed as clusters bound to several units. FIG. 4 illustrates one cluster. A general GPU 116 arranges four to sixteen shader clusters in one cluster. The instruction execution structure of the GPU 116 is very simplified.

On the whole, the entire shader clusters process a plurality of data with one instruction in a large-scale SIMD type processor. This type of processor is suitable for an operation having data-level parallelism, but has a small data storage space as compared with a dedicated SIMD hardware. Therefore, it is preferable that an SIMD operation of high capacity is performed by a dedicated SIMD hardware and the GPU 116 performs a parallel operation of data the amount of which is smaller than a preset one in a work having data-level parallelism.

Figure 5:
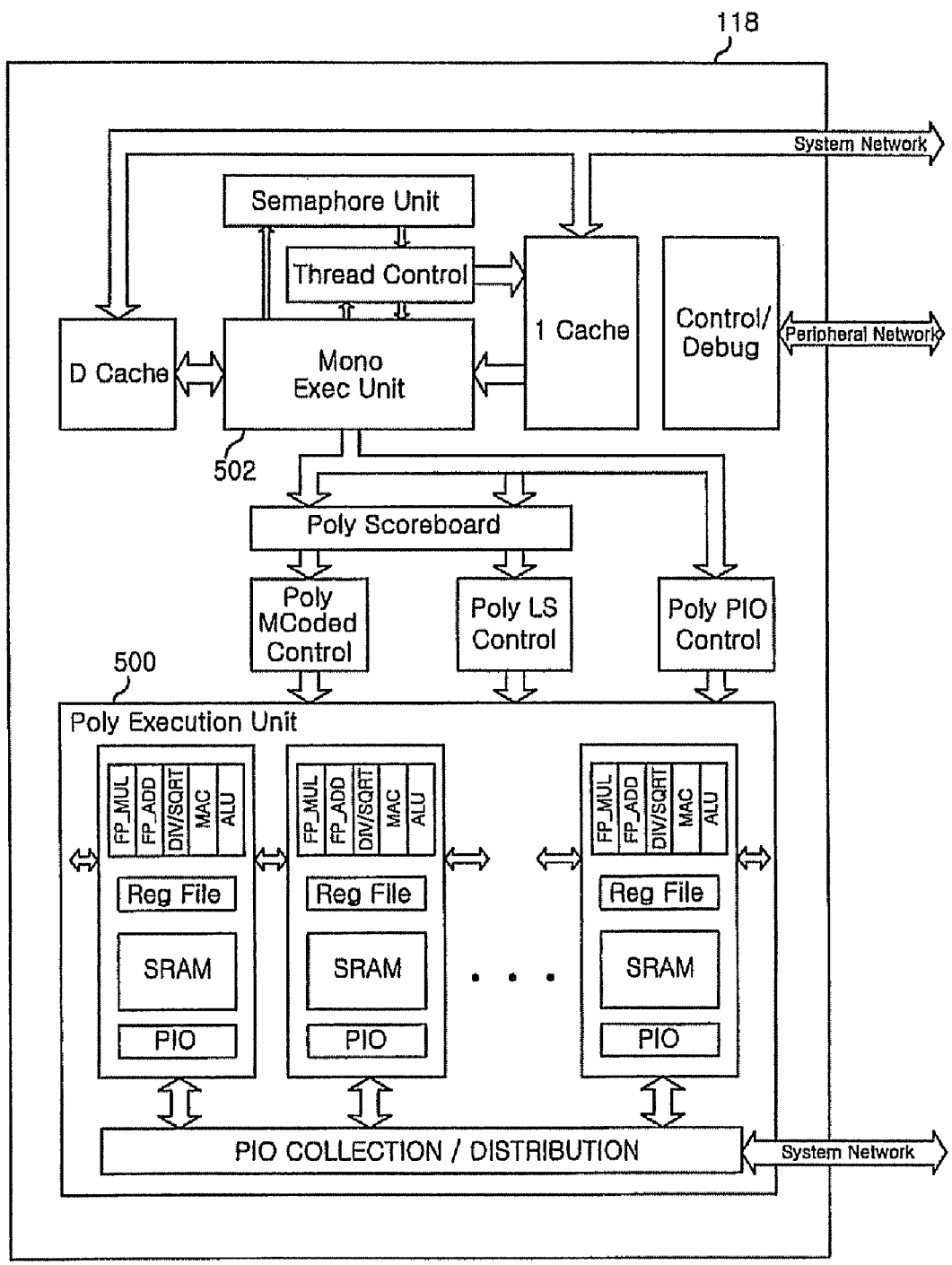
FIG. 5 is a block diagram illustrating the structure of a dedicated SIMD hardware of a parallel global illumination rendering system in accordance with an embodiment of the present invention.

FIG. 5 is a block diagram illustrating the structure of a dedicated SIMD hardware of the parallel global illumination rendering system of FIG. 1.

With reference to FIG. 5, the dedicated SIMD hardware 118 takes the form of an array processor, and includes a poly execution (PE) unit 500 corresponding to an array processor and a mono execution unit 502 for execution of the PE unit 500. Since the dedicated SIMD hardware 118 can store data the amount of which is larger than that of data stored in the GPU 116, a parallel operation of data the amount of which is larger than a preset one in a work having data-level parallelism is possible.

Figure 6:
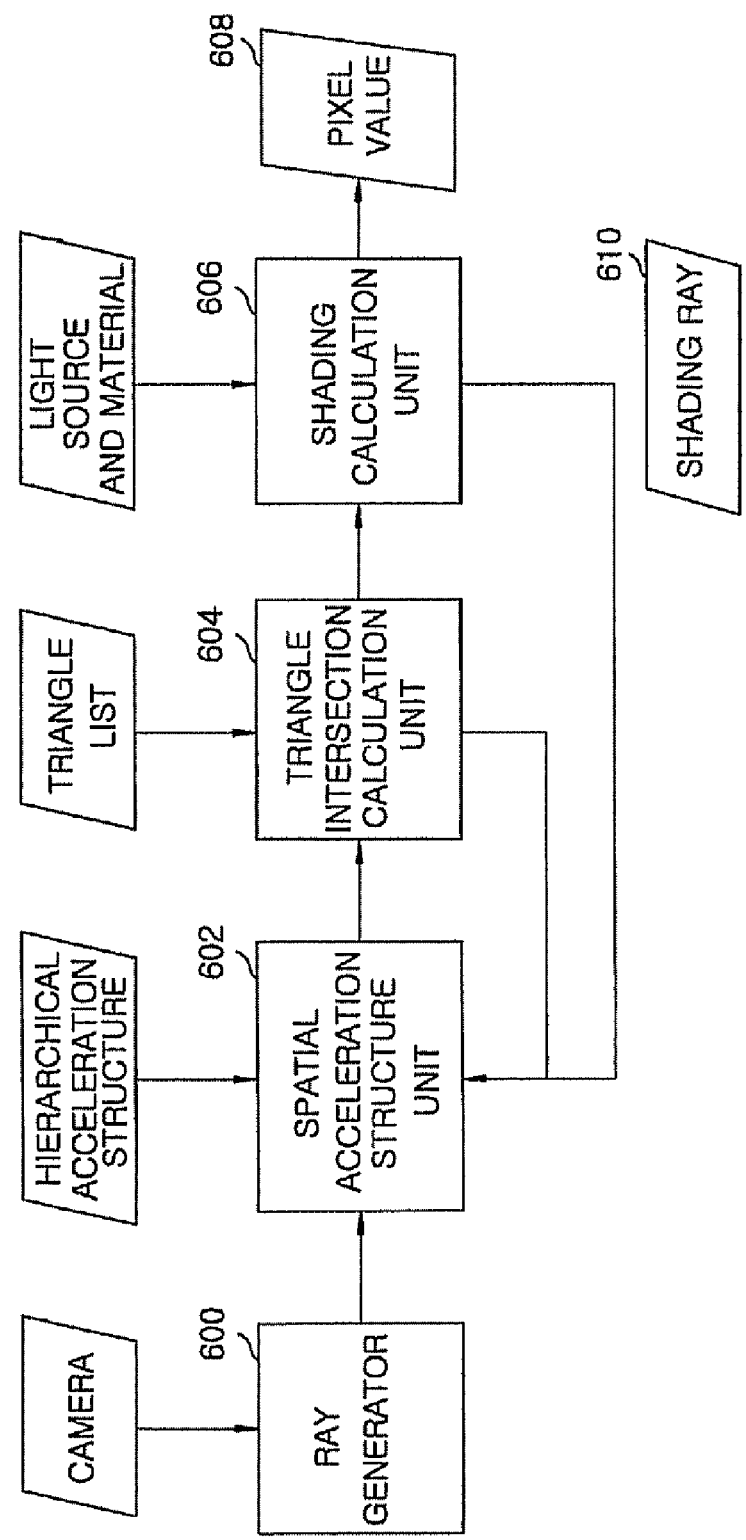
FIG. 6 is a view illustrating rendering handling flows by ray tracing performed in a parallel global illumination rendering system in accordance with an embodiment of the present invention.

FIG. 6 is a view illustrating rendering handling flows by ray tracing performed in a parallel global illumination rendering system in accordance with an embodiment of the present invention.

Figure 9:
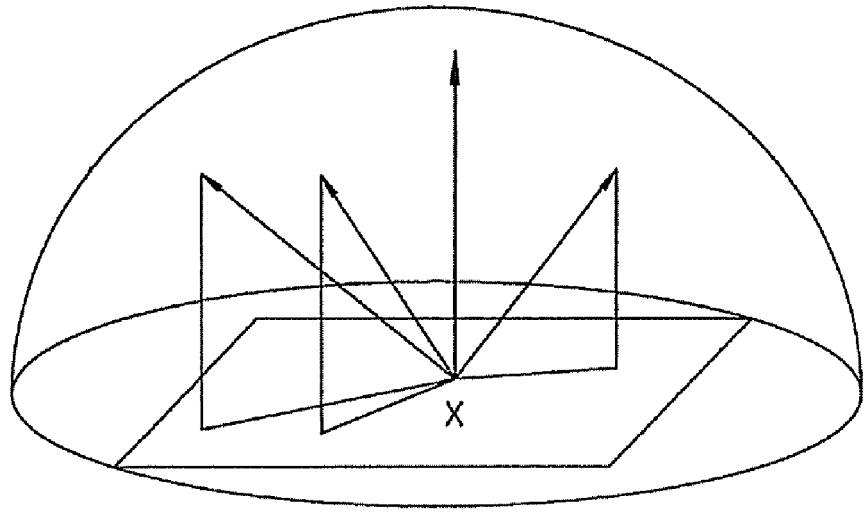
FIG. 9 is a view illustrating a technique of hemisphere sampling used in ray tracing in accordance with an embodiment of the present invention.

With reference to FIG. 6, an object of ray tracing is to mathematically predict a path of a quantum particle by vectorizing its motion and size. First, a ray generator 600 creates rays for pixels of an image that is to be rendered. Then, the ray generator 600 obtains a collision point of a primary ray and primitive objects in an input scene and creates a secondary ray with the collision point being its start point. For example, as illustrated in FIG. 9, the ray generator 600 calculates a ray that can be created on a hemisphere with respect to an arbitrary start point x of ray by using probability, in order to create the ray. This type of sampling technology of a ray is called hemisphere sampling. Therefore, an operation for creation of a ray is performed by the sample creator 104 and the parallel random number generator 106 and a shading operation at a collision point is performed by the Monte Carlo integration handler 108.

For example, during ray tracing, the reflection characteristics of light is considered in order to handle rendering of a primary ray having data-level parallelism by creating a subpixel position of the primary ray using created parallel random numbers, to handle rendering of a secondary ray created by the primary ray by creating a sample through sampling of a hemisphere, and to handle rendering of a color values at a collision point of each ray and a scene object by carrying out Monte Carlo integration.

A spatial acceleration structure unit 602 traverses a hierarchy for the input scene using the created rays. A spatial acceleration structure in a three-dimensional scene is usually hierarchical in computer graphics, and the search structure used in the spatial acceleration structure unit 602 is also hierarchical. That is, contents of the highest priority level contain contents of the next lower priority level, which contents contain contents of the still next lower priority level again.

Therefore, the above-mentioned hierarchical structure has an attribute of overlap and repetition, and various types of examinations can be promptly performed by using the hierarchical structure. Generally, the cost of O(n) for an operation decreases to the cost of O(log n) by creating a hierarchical structure to perform the operation. The hierarchical acceleration structure can by employed by selecting one or more from well-known algorithms such as a bounding volume hierarchy, a BSP tree, a k-d tree, an octree, an oriented bounding box (OBB) tree, and a k-DOP (discrete orientation poly tope).

Meanwhile, the spatial acceleration structure unit 602 performs a function of sorting detailed collision detection objects when determining whether a ray and an object collide with each other.

A triangle intersection calculation unit 604 determines whether objects intersect each other and calculates a contact point when the objects intersect each other. Objects to which a collision detection is carried out include a triangle and a triangle list. A shading calculation unit 606 calculates a color on a surface of a three-dimensional object that appears when light is reflected according to the characteristics of the surface of the object, by using a calculated contact point. Then, the shading calculation unit uses an input shader program programmed by an initial user. The shader program describes the attributes of surfaces of objects in a three-dimensional screen and can be created using a language such as the standard OpenGL Shading Language (GLSL) and a commercial NVIDIA Cg. The basic object of the shader program is to provide a programmable flexibility by which a user or a developer can change the attributes of an object reacting to light.

As mentioned above, the shading calculation unit 606 calculates a color on a surface of an object by using a shader program, outputs the calculation result per pixel as a pixel value 608, and accumulates and stores the output value on an image. The shading calculation unit 606 repeats a spatial search by sending a used shading ray 610 to the spatial acceleration structure unit 602.

Figure 7:
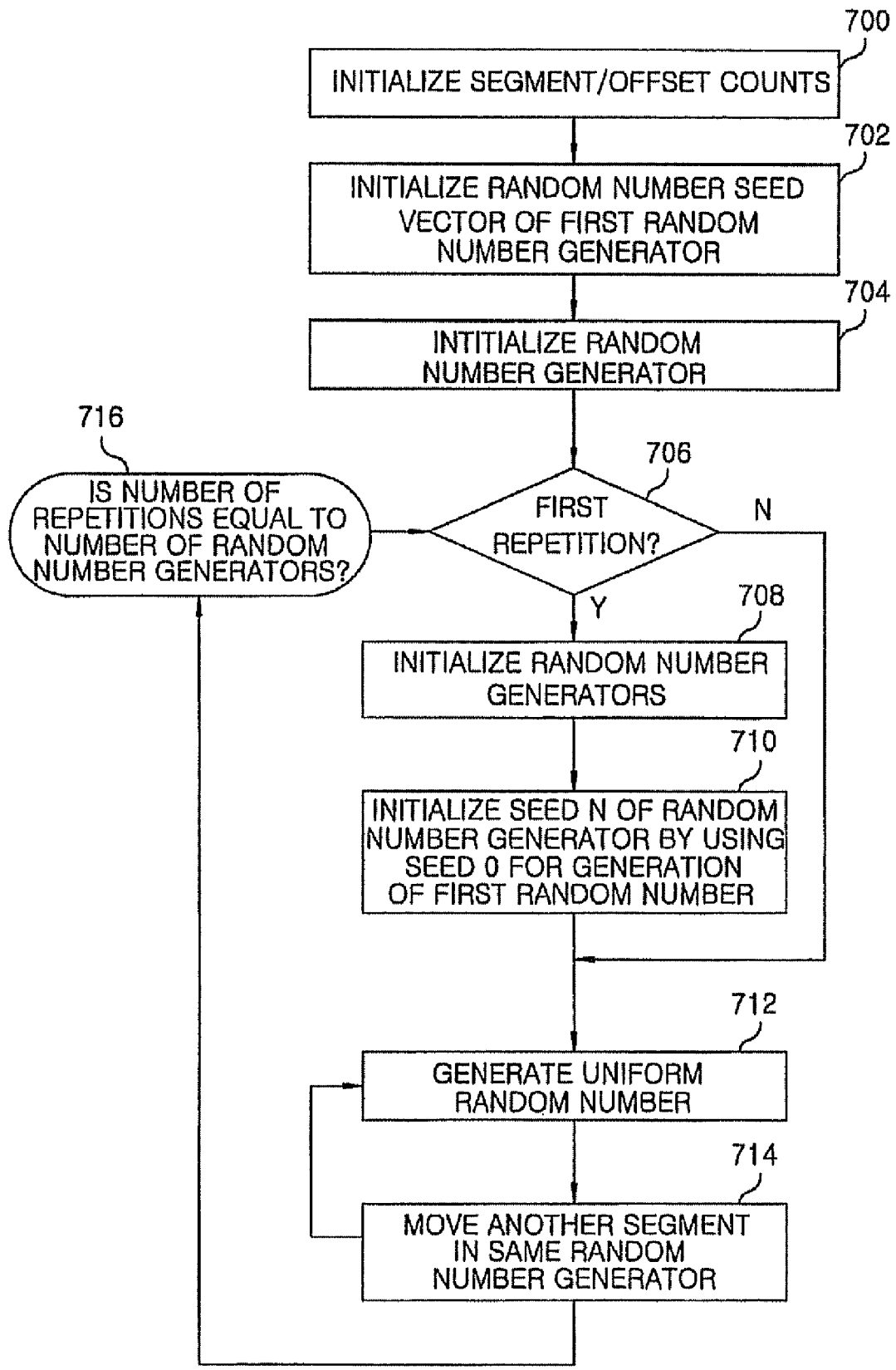
FIG. 7 is a flowchart illustrating procedures of a parallel random number generator in a parallel global illumination rendering system in accordance with an embodiment of the present invention.

FIG. 7 is a flowchart illustrating procedures of a parallel random number generator in a parallel global illumination rendering system in accordance with an embodiment of the present invention.

With reference to FIG. 7, generation of parallel random numbers that is performed in the parallel random number generator 106 can be largely classified into an initialization step and a generation step. As the initialization step, all segment/offset counts of given random number generators are initialized in the step 700, and random number seed vectors of the first random number generator are initialized in the step 702. In the process, the seed vector of the random number 0 is initialized to {11111111, 22222222, 33333333, and 44444444}. The random number generator is initialized to its initial value or another arbitrary seed in the step 704.

The generation step starts with the step 706 in which a separate initializing work is performed in the case of the first repetition. The random number generators are initialized according to generator/simulation/set Ids in the step 708, and the seed n of another random number generator is initialized by using the seed 0 of the first random number generator in the step 710. Thereafter, a control process goes to the step 712.

On the other hand, in the step 706, a control process advances to the step 712 in the case of second repetition. If the initializations in the steps 708 and 710 are finished, after uniform random numbers within a range of 0 to 1 are generated with respect to parameters/items/factors in the step 712 and the steps 714 and 712 are repeated by the number of items, movement to another segment in a same generator is performed. Thereafter, in the step 716, the steps 706 to 714 are repeated until the number of repetition equal to the number of generators to generate random numbers.

Figure 8:
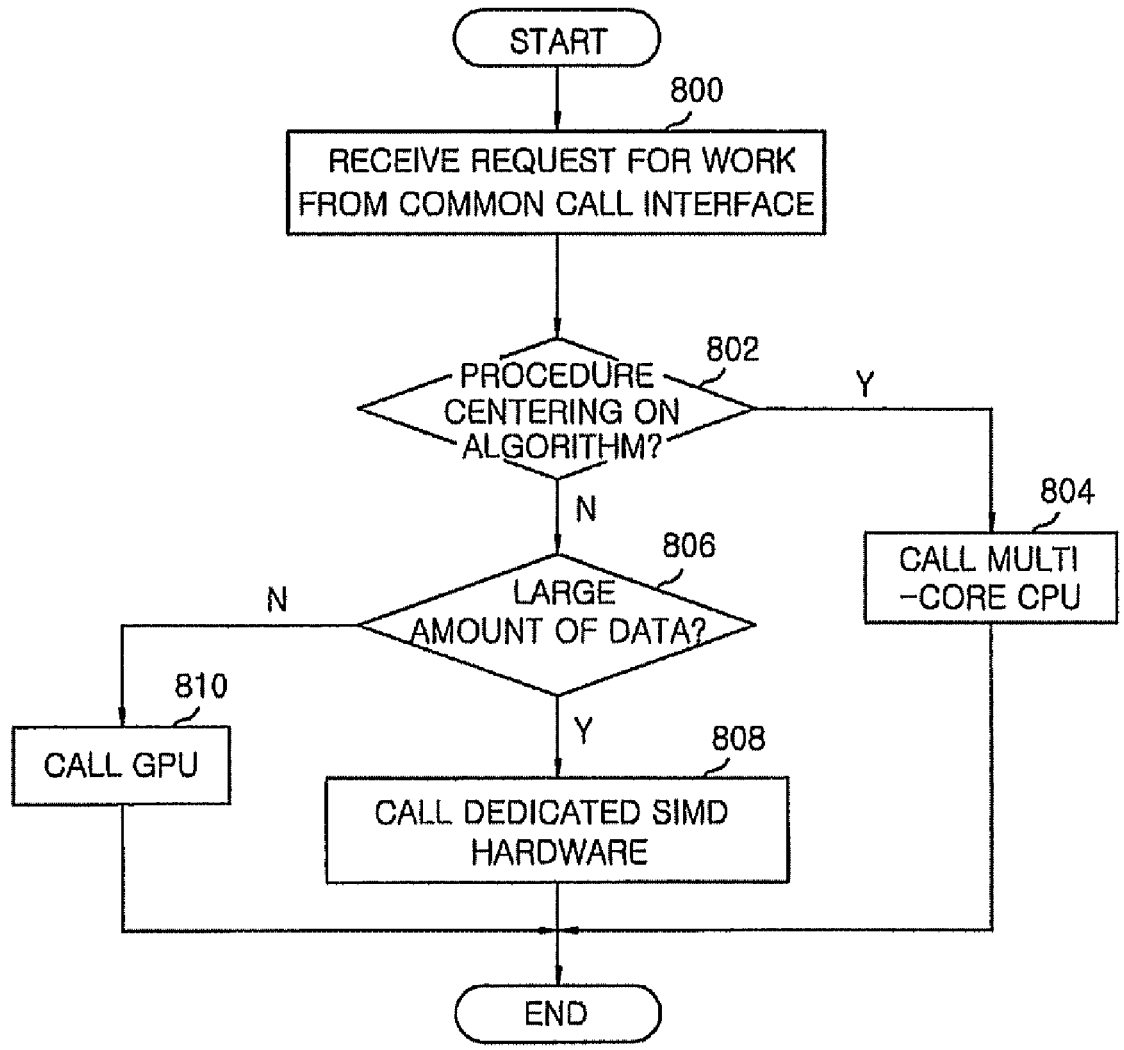
FIG. 8 is a flowchart illustrating procedures of a system call controller in a parallel global illumination rendering system in accordance with an embodiment of the present invention.

FIG. 8 is a flowchart illustrating procedures of a system call controller in a parallel global illumination rendering system in accordance with an embodiment of the present invention.

With reference to FIG. 8, the system call control unit 112 in the parallel global illumination rendering system 100 calls and controls a function demanded by the common call interface 110. In the step 800, the function demanded by the common call interface 110 to process a work is received. In the step 802, it is determined whether the received function is a parallel algorithm work. In the case of a parallel algorithm work, in the step 804, the multi-core CPU 114 is called to use the multi-core CPU 114 in performing the demanded work.

Then, in the case of a parallel data work instead of a parallel algorithm work, in the step 806, it is determined whether the capacity of the demanded work exceeds a preset one. If the amount of processed data is larger than a preset one, the dedicated SIMD hardware 118 is called and processed in the step 808. However, when the demanded work contains data the amount of which is smaller than a preset one, the GPU 116 is called to process the data.

The present invention can be applied to the fields of rendering of interactive global illumination and real-time ray tracing by remarkably improving the efficiencies of generation of random numbers for creation of a ray and Monte Carlo integration, which cause bottleneck phenomena in rendering of global illumination, through a parallel global illumination rendering system.

As mentioned above, the present invention can improve the processing speed by performing essential operations (generation of random numbers, Monte Carlo integration, etc.) causing bottlenecks through a common interface in a multi-core CPU, a high speed graphics processing unit, and an Dedicated SIMD hardware, etc. when global illumination based rendering is handled through a single CPU. For this purpose, a global illumination rendering inputting scene is divided according to sections and parallel processing is performed by distributing and scheduling a work in an execution time through a system call controller controlling a common interface.

While the invention has been shown and described with respect to the embodiments, it will be understood by those skilled in the art that various changes and modifications may be made without departing from the scope of the invention as defined in the following claims.

The invention claimed is:

1. A method of rendering parallel global illumination for obtaining a realistic rendering image, the method comprising:
   generating candidate parallel random numbers for creating a sample;
   creating a sample by selecting one of the generated random numbers;
   performing Monte Carlo integration on the basis of the created sample;
   providing an application programming interface (API) common to operations having attributes of algorithm parallelism and data-level parallelism according to processed works, so that a common call interface calls a sample creating function, a random number generating function, and a Monte Carlo integration performing function;
   demanding an operation regarding a processed work from a system call controller by the common call interface;
   performing parallel processing through a preset scheduling according to the attribute of the processed work when the system call controller performs the operation demanded by the common call interface; and
   performing the processed work transferred from the system call controller by an operation hardware.

2. The method of claim 1, wherein the operation hardware comprises:
   a multi-core central processing unit (CPU) in which a plurality of cores are mounted to one processor;
   a graphic processing unit to which a programmable shader processor is mounted; and
   a single instruction multiple data (SIMD) dedicated hardware processing a large amount of parallel data by using an array processor.

3. The method of claim 2, wherein performing parallel processing through a preset scheduling further comprises:
   instructing the multi-core CPU to process the work by the system call controller when the attribute of the processed work is a parallel algorithm work.

4. The method of claim 2, wherein performing parallel processing through a preset scheduling further comprises:
   instructing the dedicated SIMD hardware to process the work by the system call controller when the attribute of the processed work is a parallel data work and the amount of the processed data is larger than a preset amount of data.

5. The method of claim 2, wherein performing parallel processing through a preset scheduling further comprises:
   instructing the GPU to process the work by the system call controller when the attribute of the processed work is a parallel data work and the amount of the processed data is equal to or smaller than a preset amount of data.

6. A system of rendering parallel global illumination, the system comprising:
   a parallel random number generator generating candidate parallel random numbers in order to create a sample for rendering of global illumination for obtaining a realistic rendering image;
   a sample creator creating a sample by selecting one of the generated random numbers;
   a Monte Carlo integration handler handling Monte Carlo integration on the basis of the created sample;
   a common call interface calling functions of the sample creator, the parallel random number generator, and the Monte Carlo integration handler, providing an application programming interface (API) common to operations having attributes of algorithm parallelism and data-level parallelism according to processed works, and demanding an operation regarding a processed work from a system call controller;
   a system call controller performing parallel processing through a preset scheduling according to the attribute of the processed work when the system call controller performs the operation demanded by the common call interface; and
   an operation hardware performing the work transferred from the system call controller.

7. The system of claim 6, wherein the operation hardware comprises:
   a multi-core central processing unit (CPU) in which a plurality of cores are mounted to one processor;
   a graphic processing unit(GPU) to which a programmable shader processor is mounted; and
   a dedicated single instruction multiple data (SIMD) hardware processing a large amount of parallel data by using an array processor.

8. The system of claim 7, wherein the system call controller instructs the multi-core CPU to process the work when the attribute of the processed work is a parallel algorithm work.

9. The system of claim 7, wherein the system call controller instructs the dedicated SIMD hardware to process the work when the attribute of the processed work is a parallel data work and the amount of the processed data is larger than a preset one.

10. The system of claim 7, wherein the system call controller instructs the GPU to process the work when the attribute of the processed work is a parallel data work and the amount of the processed data is equal to or smaller than a preset one.

* * * * *